(12) United States Patent
Tokumoto

(10) Patent No.: US 6,363,797 B1
(45) Date of Patent: Apr. 2, 2002

(54) ROTATIONAL ANGLE DETECTING DEVICE TORQUE DETECTING DEVICE AND STEERING APPARATUS

(75) Inventor: Yoshitomo Tokumoto, Nabari (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/739,820

(22) Filed: Dec. 20, 2000

(30) Foreign Application Priority Data

Sep. 27, 2000 (JP) ........................................ 2000-294731

(51) Int. Cl.[7] ................................................. G01L 3/02
(52) U.S. Cl. .................................................. 73/862.328
(58) Field of Search ....................... 73/862.08, 862.324, 73/862.331, 862.333, 862.328, 862.329

(56) References Cited

U.S. PATENT DOCUMENTS 4,996,890 A * 3/1991 Taniguchi et al. ...... 73/862.331
5,578,767 A * 11/1996 Chikaraishi et al. ... 73/862.331
5,796,014 A * 8/1998 Chikaraishi et al. ... 73/863.331

FOREIGN PATENT DOCUMENTS

JP 200049912 2/2000

* cited by examiner

Primary Examiner—Max Noori

(57) ABSTRACT

A rotational angle detecting device includes a rotating member and a target which is provided on the rotating member. The target has a variable inclining portion to be detected is continuously changed as the rotating member rotates, and at least one detecting device, for detecting the portion close to the target. The detecting displacement angle of the rotating member from the detecting device is detected in a rotational direction based on the portion detected by the detecting device. Thus, it is possible to achieve a rotational angle detecting device, a torque detecting device using the rotational angle detecting device, and a steering apparatus capable of easily forming targets, stabilizing a peak value of a detection signal of the detecting means and readily calculating and correcting a rotational angle.

18 Claims, 15 Drawing Sheets

FIG. 12

| STEERING ANGLE | $\theta_1$ | $\theta_2$ | .... | $\theta_n$ |
|---|---|---|---|---|
| OUTPUT OF SENSOR | $V_1$ | $V_2$ | .... | $V_n$ |
| TARGET OUTPUT OF SENSOR | $V_1'$ | $V_2'$ | .... | $V_n'$ |
| DEVIATION | $\delta_1$ | $\delta_2$ | .... | $\delta_n$ |
| DEVIATION CANCELING ORBIT | $P_1$ | $P_2$ | .... | $P_n$ |

ROTATIONAL ANGLE DETECTING DEVICE TORQUE DETECTING DEVICE AND STEERING APPARATUS

BACKGROUND OF THE INVENTION

The present invention relates to a rotational angle detecting device for detecting a rotational angle, a torque detecting device for detecting a torque applied to an input shaft through a torsional angle generated on a connecting shaft for connecting the input shaft and an output shaft, and a steering apparatus for an automobile comprising the torque detecting device.

In an electric power steering apparatus having such a construction that a steering auxiliary motor is driven based on a detection result of a steering torque applied to a steering wheel for steering and the rotating force of the motor is transmitted to a steering apparatus to assisting in steering, there is an advantage that an auxiliary force characteristic corresponding to a running state such as a vehicle speed or a steering frequency can be controlled more easily than a hydraulic power steering apparatus using a hydraulic actuator as a source for generating steering auxiliary force. In recent years, therefore, the coverage of the device has tended to be enlarged.

In the electric power steering apparatus described above, a torque detecting device for detecting a steering torque is required. Therefore, there has been used a torque detecting device having such a construction that an input shaft on the steering wheel side and an output shaft on the steering mechanism side of the steering shaft for connecting the steering wheel and the steering mechanism a re connected to each other through a torsion bar having a small diameter, a relative angular displacement generated in the connecting portion of both shafts is detected with the torsion of the torsion bar through the action of a steering torque and the steering torque (rotational torque) is calculated based on the detection result.

FIG. 1 is a schematic view showing an example of the construction of a torque detecting device applied to a steering apparatus for an automobile which has been proposed in Japanese Patent Application No. 2000-49912 by the present applicant. In the steering apparatus, a steering shaft 3 has such a construction that an input shaft 31 having an upper end connected to a steering wheel 30 and an output shaft 32 having a lower end connected to a pinion 33 of a steering mechanism are connected coaxially through a torsion bar 34 having a small diameter and the steering wheel 30 connects with the steering mechanism. The torque detecting device has the following construction in the vicinity of the connecting portion of the input shaft 31 and the output shaft 32.

A disk-shaped target plate 2 is externally fixed coaxially to the input shaft 31 in the vicinity of an end portion for connecting the output shaft 32, and a plurality of targets 20 (ten targets in the drawing) are parallelly disposed on the outer circumferential surface of the target plate 2. These targets 20 are protrusions formed of a magnetic material which have a partial spiral configuration inclined at almost equal angles with respect to the axial direction of the input shaft 31 to which the target plate 2 is attached as shown in the development view of FIG. 2 in which the outer circumferential surface of the target plate 2 is developed.

The same target plate 2 as that described above is also fixed externally to the output shaft 32 in the vicinity of the end portion for connecting the input shaft 31, and a plurality of targets 20 inclined at almost equal angles are matched and arranged in a circumferential direction with the targets 20 on the input shaft 31 side in the axial direction of the output shaft 32 to which the target plate 2 is attached on the outer periphery thereof.

Two sensor boxes 1a and 1b are provided on the outside of the target plates 2 to face the outer edges of the targets 20 on the outer circumferential surface periphery in the circumferential direction. The sensor boxes 1a and 1b are fixed and supported in a portion such as a housing which bears the input shaft 31 and the output shaft 32 and does not move. The sensor box 1a contains a magnetic sensor 1A opposed to the target 20 on the input shaft 31 side and a magnetic sensor 2A opposed to the target 20 on the output shaft 32 side with circumferential positions aligned accurately. Similarly, the sensor box 1b contains a magnet sensor 1B opposed to the target 20 on the input shaft 31 side and a magnetic sensor 2B opposed to the target 20 on the output shaft 32 side with circumferential positions aligned accurately.

The magnetic sensors 1A, 1B, 2A and 2B are constituted by using elements having such a property that an electric characteristic (resistance) is changed by the action of a magnetic field, for example, a magnetoresistance effect element (MR element) so that a detection signal can be varied depending on the close portions of the opposed targets 20. Detection signals V1A, V1B, V2A and V2B of the magnetic sensors 1A, 1B, 2A and 2B are given to a operating unit 4 using a microprocessor provided on the outside of the sensor boxes 1a and 1b.

In the torque detecting device having such a construction, the targets 20 opposite to the magnetic sensors 1A, 2A, 1B and 2B are protrusions formed of a magnetic material which are arranged with predetermined inclinations in the axial direction on the outer circumferential surfaces of the input shaft 31 and the output shaft 32. Accordingly, when the input shaft 31 and the output shaft 32 rotate therearound, the magnetic sensors 1A, 2A, 1B and 2B output detection signals which are varied proportionally depending on a change in the rotational angles of the input shaft 31 and the output shaft 32 while the corresponding targets 20 pass through positions opposed thereto.

At this time, the detection signals of the magnetic sensors 1A and 1B correspond to the rotational angle of the input shaft 31 where the targets 20 opposite to the magnetic sensors 1A and 1B are provided, and the detection signals of the magnetic sensors 2A and 2B correspond to the rotational angle of the output shaft 32 where the targets 20 opposite to the magnetic sensors 2A and 2B are provided. Accordingly, the operating unit 4 can calculate the rotational angle of the input shaft 31 from the detection signals of the magnetic sensors 1A and 1B, so that the operating unit 4 and the magnetic sensors 1A and 1B operate as a rotational angle detecting device for the input shaft 31. Moreover, the operating unit 4 can calculate the rotational angle of the output shaft 32 from the detection signals of the magnetic sensors 2A and 2B, so that the operating unit 4 and the magnetic sensors 2A and 2B operate as a rotational angle detecting device for the output shaft 32.

A difference between the detection signal of the magnetic sensor 1A and that of the magnetic sensor 2A or a difference between the detection signal of the magnetic sensor 1B and that of the magnetic sensor 2B corresponds to a difference (relative angular displacement) in a rotational angle between the input shaft 31 and the output shaft 32. The relative angular displacement corresponds to a torsional angle generated on the torsion bar 34 connecting the input shaft 31 and the output shaft 32 under the action of a rotational torque applied to the input shaft 31. Accordingly, the rotational torque applied to the input shaft 31 can be calculated based on the difference in the above mentioned detection signal.

In the torque detecting device described above, the detection signals of the magnetic sensors 1A, 2A, 1B and 2B have unstable peak values because a great non-linearly change region is generated in the vicinity of both ends of the target 20 and a relatively small linearly change region is changed proportionally to a change in the rotational angles of the input shaft 31 and the output shaft 32 as shown in the waveform chart of FIG. 3, and it is difficult to calculate the rotational angle and the rotational torque, and furthermore, it is hard to correct them.

Moreover, the end of the target is fine. Therefore, when forming is to be carried out by using a metal mold, an error is made easily and the lifetime of the metal mold is shortened so that a manufacturing cost is increased.

BRIEF SUMMARY OF THE INVENTION

In consideration of the above-mentioned circumstances, first to seventh aspects of the present invention have an object to provide a rotational angle detecting device in which a target is formed easily, the detection signal of detecting means has a stable peak value and a rotational angle can be calculated and corrected readily.

An eighth aspect of the present invention has an object to provide a torque detecting device using the rotational angle detecting device according to the first to seventh aspects of the present invention.

A ninth aspect of the present invention has an object to provide a steering apparatus using the torque detecting device 25 according to the eighth aspect of the present invention.

A first aspect of the present invention is directed to a rotational angle detecting device characterized by comprising: a rotating member; a target which is provided on the rotating member and whose portion to be detected is continuously changed as the rotating member rotates; and one or more detecting means for detecting the portion close to the target; wherein a displacement angle of the rotating member from the detecting means in a rotational direction is detected based on the detected portion of the target detected by the detecting means.

In the rotational angle detecting device, the target is provided on the rotating member for continuously changing a portion to be detected as the rotating member rotates, and one or more detecting means for detecting a portion close to the target and detects a displacement angle therefrom in a rotational direction of the rotating member based the detected portion.

Consequently, it is possible to realize a rotational angle detecting device capable of easily forming targets, stabilizing a peak value of a detection signal of the detecting means and readily calculating and correcting a rotational angle.

A second aspect of the present invention is directed to the rotational angle detecting device, wherein the target has a first inclining portion provided with an inclination in one direction along a circumferential surface of the rotating member and a second inclining portion provided with an inclination in the other direction along the circumferential surface of the rotating member.

In the rotational angle detecting device, the target has a first inclining portion provided with an inclination in one direction along a circumferential surface of the rotating member and a second inclining portion provided with an inclination in the other direction along the circumferential surface of the rotating member. Therefore, it is possible to realize a rotational angle detecting device capable of easily forming targets, stabilizing a peak value of a detection signal of the detecting means and readily calculating and correcting a rotational angle.

A third aspect of the present invention is directed to the rotational angle detecting device, wherein the first inclining portion and the second inclining portion have a relationship of almost line symmetry with respect to a straight line in an axial direction of the rotating member to pass through a connecting point of the both inclining portions.

In the rotational angle detecting device, the first inclining portion and the second inclining portion have a relationship of almost line symmetry with respect to a straight line in an axial direction of the rotating member to pass through a connecting point of the inclining portions. Therefore, it is possible to realize a rotational angle detecting device capable of easily forming targets, reducing a non-linear region of a detection signal which is generated in the connecting portion of the inclining portions and the end of the target, stabilizing a peak value of a detection signal of the detecting means and readily calculating and correcting a rotational angle.

A fourth aspect of the present invention is directed to the rotational angle detecting device, wherein a plurality of targets are provided continuously along the circumferential surface of the rotating member.

In the rotational angle detecting device, a plurality of targets are provided continuously along the circumferential surface of the rotating member. Therefore, it is possible to realize a rotational angle detecting device capable of easily forming targets, increasing a detection sensitivity, stabilizing a peak value of a detection signal of the detecting means and readily calculating and correcting a rotational angle.

A fifth aspect of the present invention is directed to the rotational angle detecting device, wherein the target is formed by irradiating a beam to be a heat source along the circumferential surface of the rotating member.

In the rotational angle detecting device, the target is formed by irradiating a beam to be a heat source along the circumferential surface of the rotating member. Therefore, it is possible to realize a rotational angle detecting device capable of easily forming targets, stabilizing a peak value of a detection signal of the detecting means and readily calculating and correcting a rotational angle.

A sixth aspect of the present invention is directed to the rotational angle detecting device, wherein the target outputs each standard detection signal value when the detecting means performs detection, based on a deviation of each detection signal value outputted by detecting each portion of a master target as a standard by the detecting means and the standard detection signal value to be outputted by detecting each portion by the detecting means.

In the rotational angle detecting device, the target outputs each standard detection signal value when the detecting means performs detection, based on a deviation of each detection signal value outputted by detecting each portion of a master target as a standard by the detecting means and the standard detection signal value to be outputted by detecting each portion by the detecting means.

Therefore, it is possible to realize a rotational angle detecting device capable of easily providing a target having a small non-linear region of a detection signal which is generated in the connecting portion of the inclining portions and the end portions, stabilizing a peak value of a detection signal of the detecting means and readily calculating and correcting a rotational angle. Moreover, a detection error of the detecting means can be corrected in advance during manufacture.

A seventh aspect of the present invention is directed to the rotational angle detecting device, wherein the target is magnetically discontinuous for a circumferential portion, and the detecting means is a magnetic sensor.

In the rotational angle detecting device, the target is magnetically discontinuous for a circumferential portion, and the detecting means is a magnetic sensor. Therefore, it is possible to realize a rotational angle detecting device capable of easily forming targets, readily performing handling, reducing the cost of parts stabilizing a peak value of a detection signal of the detecting means and readily calculating and correcting a rotational angle.

An eighth aspect of the present invention is directed to a torque detecting device for detecting a torque applied to an input shaft based on a torsional angle generated on a torsion bar for coaxially connecting the input shaft and an output shaft, characterized by comprising: a rotational angle detecting device according to any one of first through seventh aspect which is attached to each of the input shaft and the output shaft; means for detecting a difference between displacement angles detected by the rotational angle detecting devices; wherein a difference between the displacement angles which is detected by the detecting means is detected as the torsional angle.

In the torque detecting device, a torque applied to an input shaft is detected based on a torsional angle generated on a torsion bar for coaxially connecting the input shaft and an output shaft. The rotational angle detecting device according to any of the first through seventh aspects of the invention is attached to each of the input shaft and the output shaft, and the detecting means detects a difference between displacement angles detected by the rotational angle detecting device, and a difference between the displacement angles which is detected by the detecting means is detected as the torsional angle generated on a torsion bar.

Consequently, it is possible to realize a torque detecting device using a rotational angle detecting device capable of easily forming targets, stabilizing a peak value of a detection signal of the detecting means and readily calculating and correcting a rotational angle.

A ninth aspect of the present invention is directed to a steering apparatus characterized by comprising an input shaft connected to a steering wheel, an output shaft connected to a steering mechanism, a torsion bar for connecting the input shaft and the output shaft, and a torque detecting device according to the eighth aspect of the invention which detects a steering torque applied to the input shaft based on a torsional angle generated by the torsion bar.

In the steering apparatus, an input shaft is connected to a steering wheel, an output shaft is connected to a steering mechanism, a torsion bar connects the input shaft and the output shaft. The torque detecting device according to the eighth aspect of the present invention detects a steering torque applied to the input shaft based on a torsional angle generated by the torsion bar.

Consequently, it is possible to realize a steering apparatus comprising a torque detecting device capable of accurately detecting a steering torque and easily forming targets of a rotational angle detecting device.

The above and further objects and features of the invention will more fully be apparent from the following detailed description with accompanying drawings.

BRIEF DESCRIPTION OF THE SEVERAL VIEWS OF THE DRAWINGS

FIG. 12 is a diagram for explaining a list created by an orbit correction unit;

DETAILED DESCRIPTION OF THE INVENTION

Figure 4:
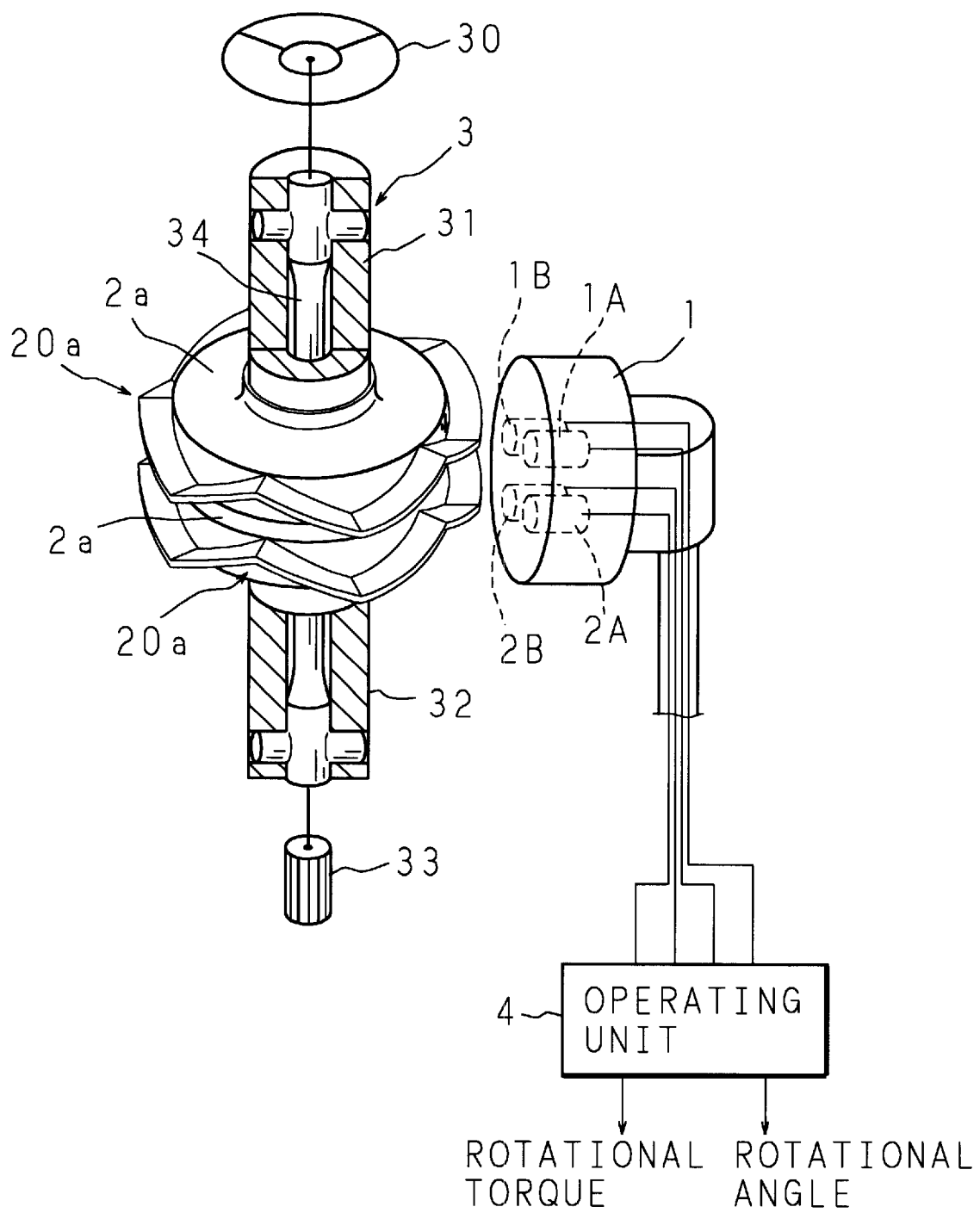
FIG. 4 is a schematic view showing the constructions of a rotational angle detecting device and a torque detecting device according to an embodiment of the present invention.

An embodiment of the present invention will be described below with reference to the drawings.
First Embodiment FIG. 4 is a schematic view showing the construction of a rotational angle detecting device and a torque detecting device according to a first embodiment of the present invention. The rotational angle detecting device and the torque detecting device are applied to a steering apparatus for an automobile, in which a steering shaft 3 has such a construction that an input shaft 31 having an upper end connected to a steering wheel 30 and an output shaft 32 having a lower end connected to a pinion 33 of a steering mechanism are connected coaxially through a torsion bar 34 having a small diameter, so that the steering wheel 30 connects with the steering mechanism. The torque detecting device has the following construction in the vicinity of the connecting portion of the input shaft 31 and the output shaft 32.

A disk-shaped target plate 2a (rotating member) is externally fixed coaxially to the input shaft 31 in the vicinity of an end portion for connecting the output shaft 32, and a plurality of targets 20a (five targets in the drawing) are arranged on the outer circumferential surface of the target plate 2a.

Figure 5:
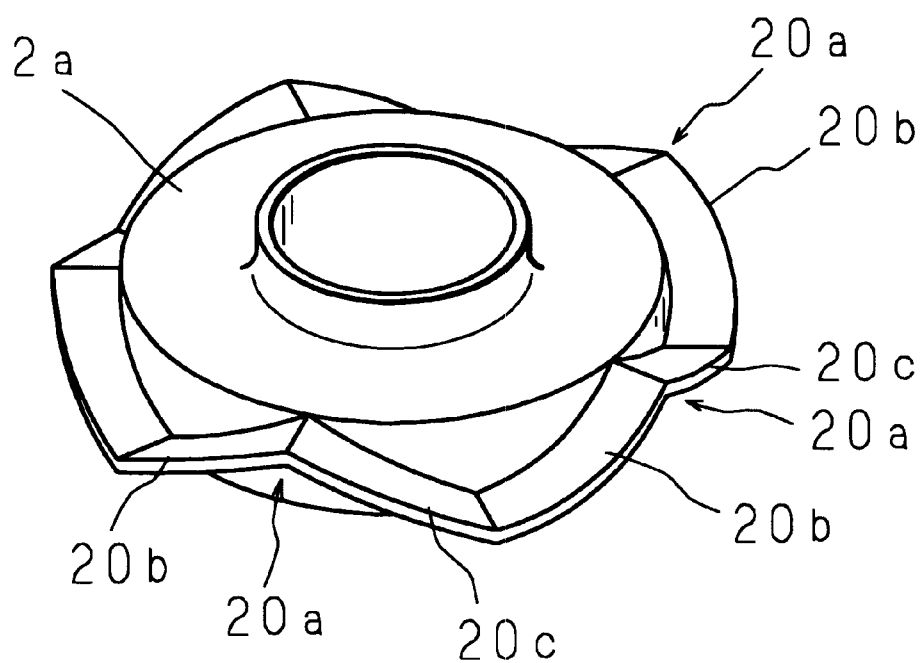
FIG. 5 is a perspective view showing the construction of a target plate and a target.
Figure 6:
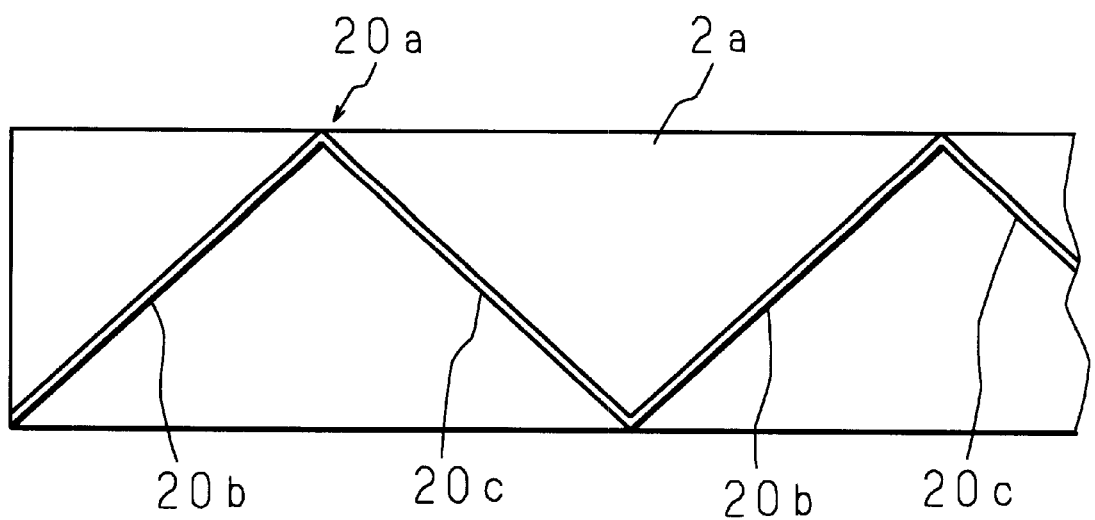
FIG. 6 is an development view showing the outer circumferential surface of the target plate.

FIG. 5 is a perspective view showing the construction of the target plate 2a and the target 20a. As shown in the development view of FIG. 6 in which the outer circumferential surface of the target plate 2a is developed, the target 20a is a protrusion formed of a magnetic material which includes a first inclining portion 20b provided with an inclination in one direction along the outer circumferential surface of the target plate 2a and a second inclining portion 20c provided with an inclination in the other direction. The targets 20a are arranged at same intervals in the circumferential direction of the outer circumferential surface of the target plate 2a.

The first inclining portion 20b and the second inclining portion 20c are almost line symmetrical with respect to a straight line in the axial direction of the rotating shaft of the target plate 2a to pass through a connecting point thereof.

The target plate 2a including the same target 20a as that described above is also fixed externally to the output shaft 32 in the vicinity of the end portion for connecting the input shaft 31, and the target 20a of the target plate 2a on the output shaft 32 side and the target 20a of the target plate 2a on the input shaft 31 side are matched and arranged in the circumferential direction.

A sensor box 1 is provided on the outside of both target plates 2 to face the outer edges of the targets 20a on respective outer circumferential surfaces. The sensor box 1 is fixed and supported in a portion such as a housing which bears the input shaft 31 and the output shaft 32 and does not move. The sensor box 1 contains magnetic sensors 1A and 1B opposed to different portions of the target 20a in the circumferential direction on the input shaft 31 side and magnetic sensors 2A and 2B opposed to different portions of the target 20a in the circumferential direction on the output shaft 32 side. The magnetic sensors 1A and 2A, and that of 1B and 2B are accurately aligned with respect to the circumferential positions, respectively.

The magnetic sensors 1A, 2A, 1B and 2B are constituted by using elements having such a property that an electric characteristic (resistance) is changed by the action of a magnetic field, for example, a magnetoresistance effect element (MR element) so that a detection signal can be varied depending on the close portions of the opposed targets 20. Detection signals V1A, V2A, V1B and V2B of the magnetic sensors 1A, 2A, 1B and 2B are given to a operating unit 4 using a microprocessor provided on the outside of the sensor box 1.

Description will be given to the operations of the rotational angle detecting device and the torque detecting device which have such constructions.

The targets 20a to which the magnetic sensors 1A, 2A, 1B and 2B are opposed are protrusions formed of a magnetic material which are arranged at same intervals in the circumferential direction along the outer circumferential surfaces of the target plates 2a which are externally fixed coaxially to the input shaft 31 and the output shaft 32. Each target 20a includes the first inclining portion 20b inclined in one direction and the second inclining portion 20c inclined in the other direction.

Figure 7:
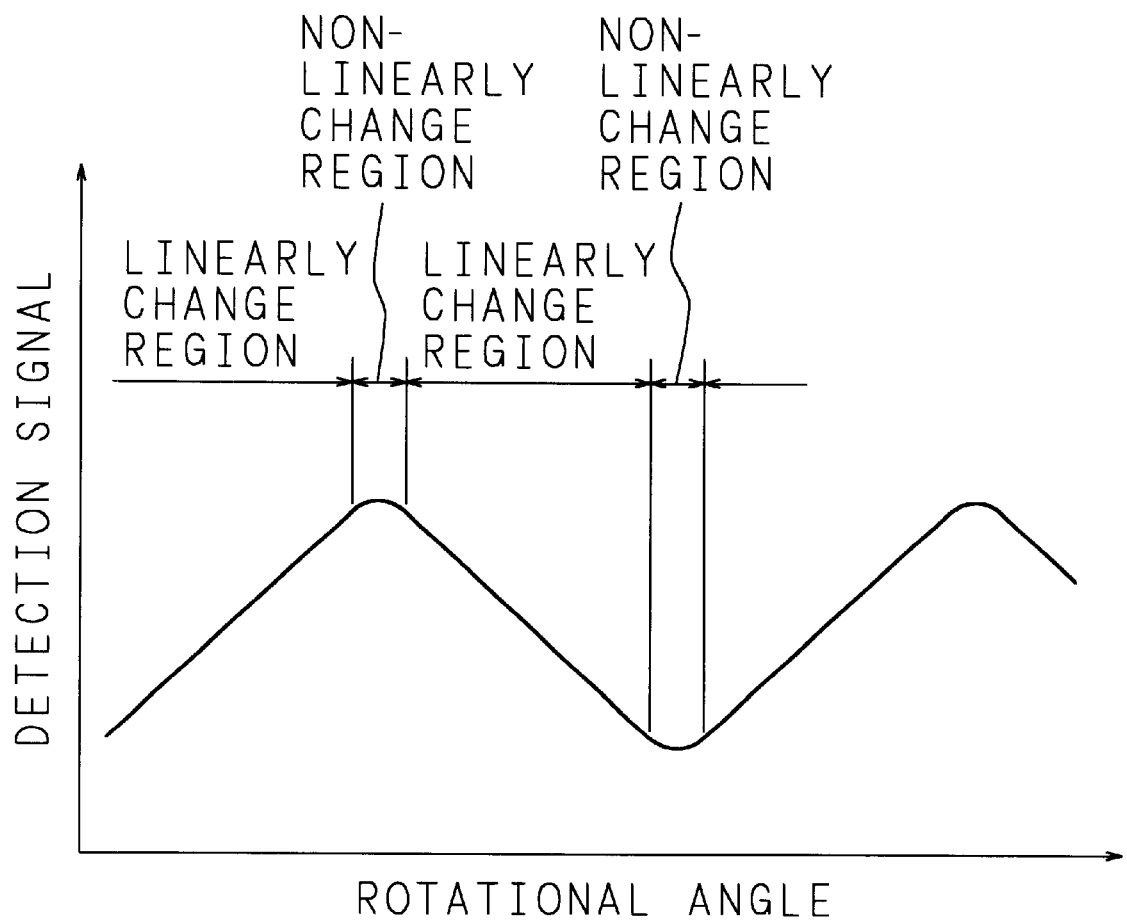
FIG. 7 is a waveform diagram showing an example of the detection signal of the rotational angle detecting device.

Accordingly, when the input shaft 31 and the output shaft 32 rotate therearound, the magnetic sensors 1A, 2A, 1B and 2B output the detection signals which are varied proportionally depending on a change in the rotational angles of the input shaft 31 and the output shaft 32 as shown in FIG. 7 while the corresponding targets 20a pass through positions opposed thereto.

Figure 1:
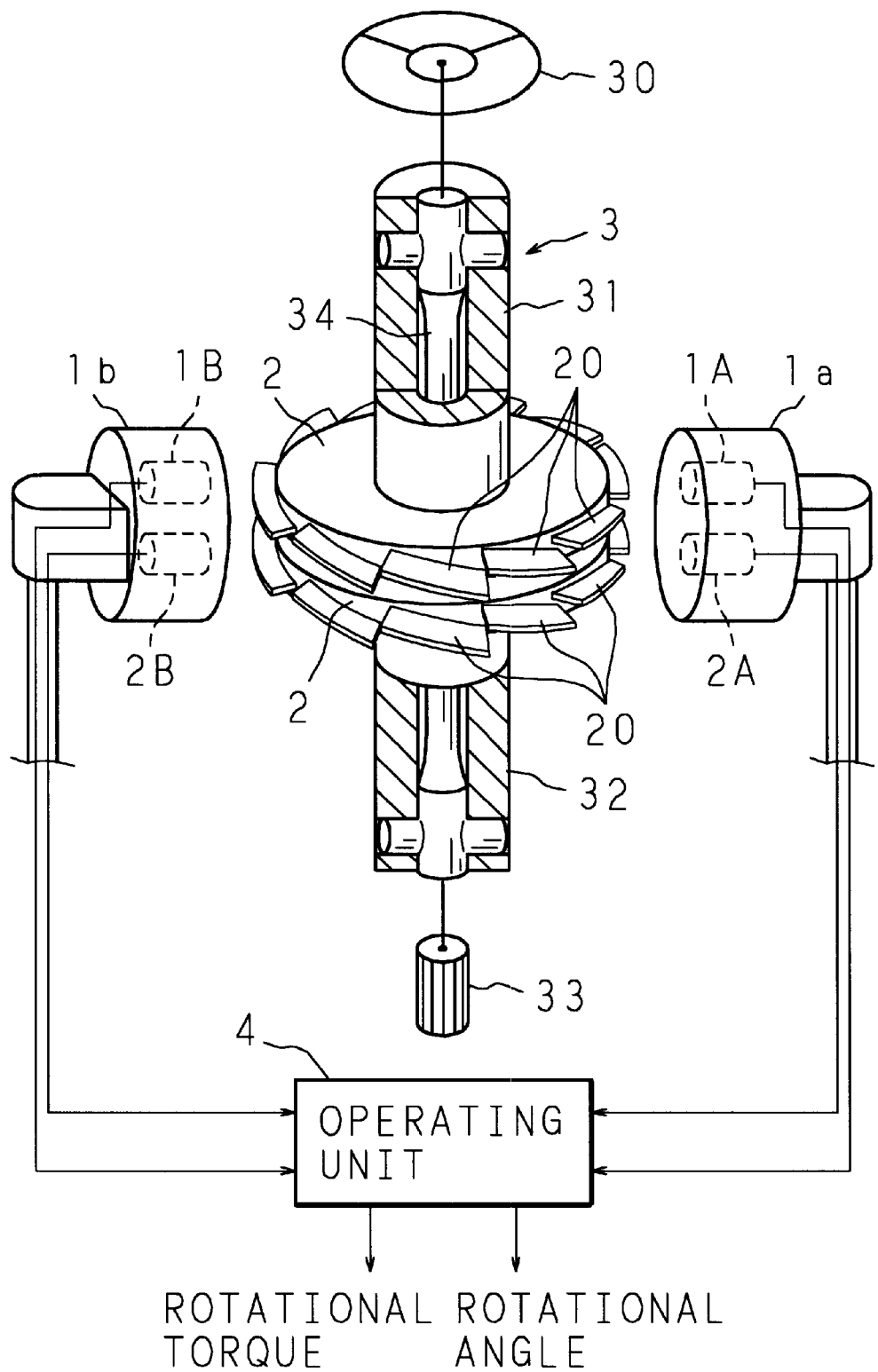
FIG. 1 is a schematic view showing an example of the construction of a conventional torque detecting device applied to a steering apparatus for an automobile.
Figure 2:
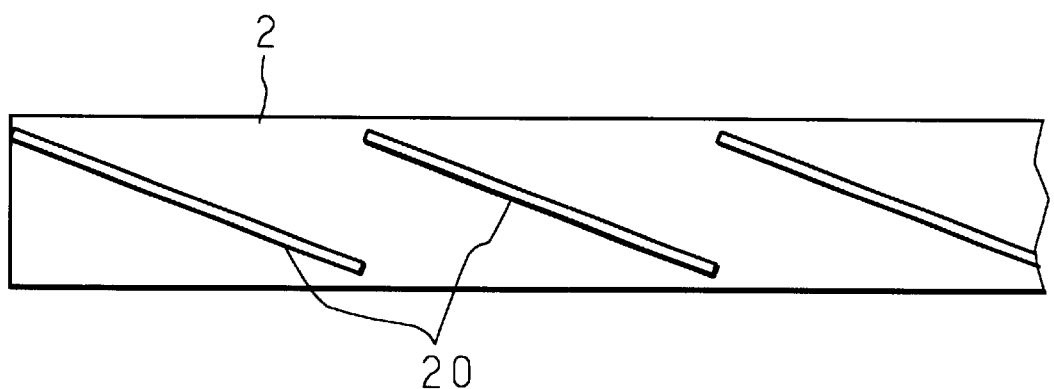
FIG. 2 is an development view showing the outer circumferential surface of a conventional target plate.
Figure 3:
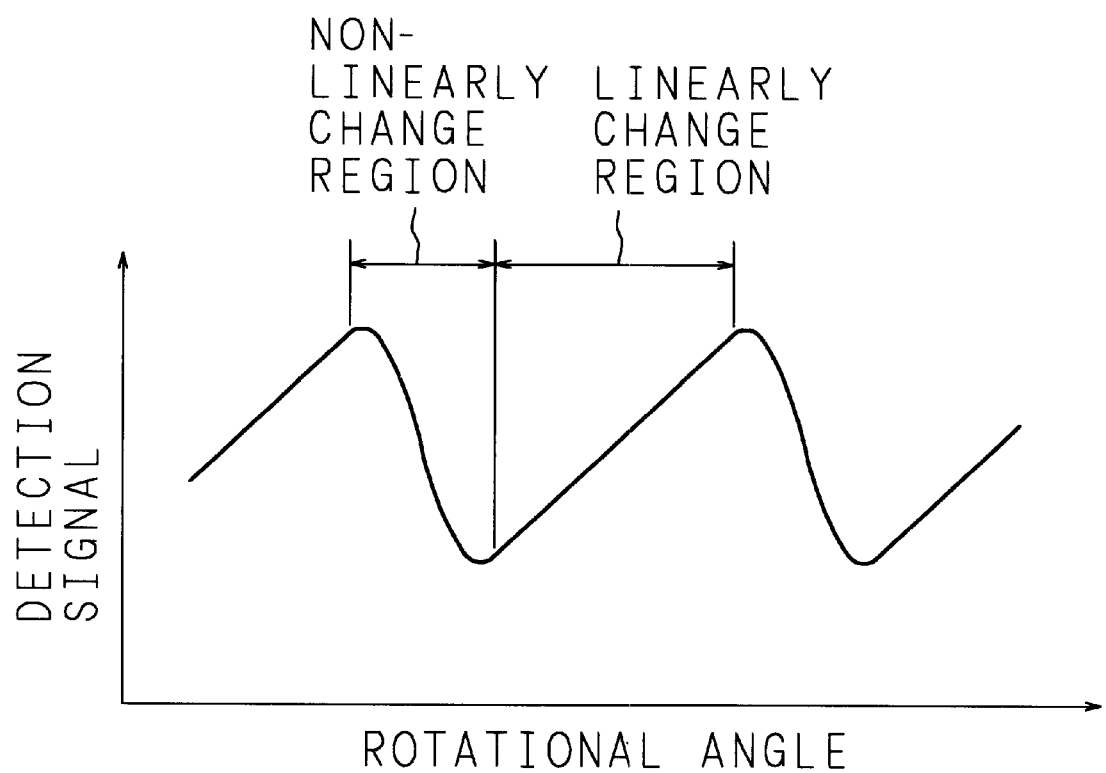
FIG. 3 is a waveform diagram showing an example of a detection signal of a conventional rotational angle detecting device.

The detection signal changes non-linearly in the vicinity where a rise is changed to a fall or the fall is changed to the rise, that is, in the vicinity of the connecting portion of the first inclining portion 20b and the second inclining portion 20c. The non-linearly change region can be more reduced that of the conventional detection signal shown in FIG. 3 because the mutual influence of a magnetic field between the first inclining portion 20b and the second inclining portion 20c is small in the vicinity of their connecting.

The detection signals of the magnetic sensors 1A and 1B correspond to the rotational angle of the input shaft 31 where the targets 20a opposed thereto are provided, and the detection signals of the magnetic sensors 2A and 2B correspond to the rotational angle of the output shaft 32 where the targets 20a opposed thereto are provided.

Accordingly, the operating unit 4 can calculate the rotational angle of the input shaft 31 from the detection signals of the magnetic sensors 1A and 1B, so that the operating unit 4 and the magnetic sensors 1A and 1B operate as a rotational angle detecting device for the input shaft 31. Moreover, the operating unit 4 can calculate the rotational angle of the output shaft 32 from the detection signals of the magnetic sensors 2A and 2B, so that the operating unit 4 and the magnetic sensors 2A and 2B operate as a rotational angle detecting device of the output shafts 32.

Figure 8:
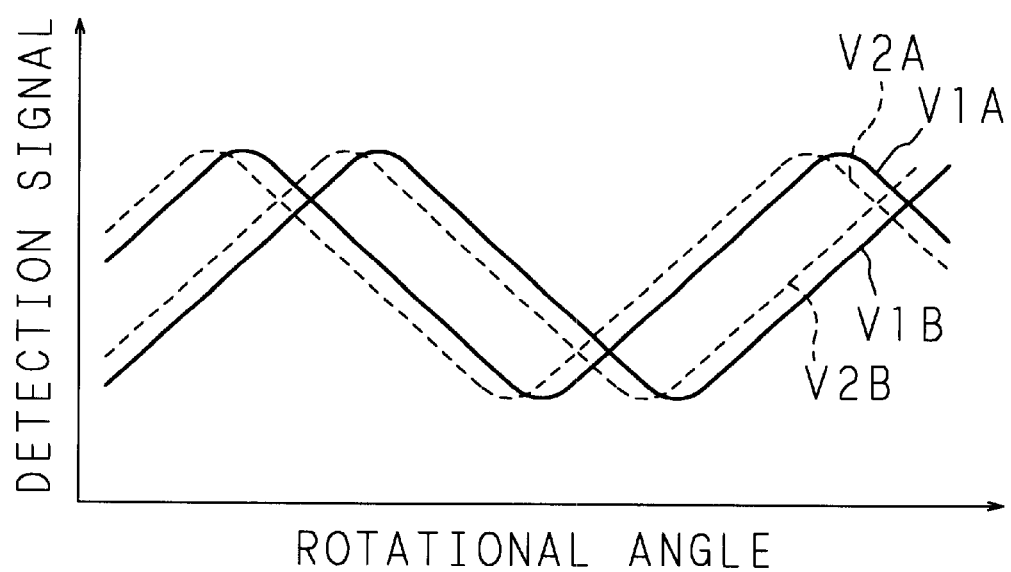
FIG. 8 is a waveform diagram showing an example of the detection signal of the rotational angle detecting device.

When a rotational torque is applied to the input shaft 31, the detection signals V1A, V1B, V2A and V2B of the magnetic sensors 1A, 1B, 2A and 2B are changed as shown in FIG. 8.

The magnetic sensors 1A and 2A and the magnetic sensors 1B and 2B have phases different from each other by 90 degrees o f electrical angle in the circumferential direction of the target plate 2a, for example. Accordingly, the detection signals V1A and V1B can be mutually complemented for the non-linearly change region and so are the detection signals V2A and V2B.

A difference between the detection signal of the magnetic sensor 1A and that of the magnetic sensor 2A or a difference between the detection signal of the magnetic sensor 1B and that of the magnetic sensor 2B corresponds to a difference in a rotational angle (relative angular displacement) between the input shaft 31 and the output shaft 32. The relative angular displacement corresponds to a torsional angle generated on the torsion bar 34 connecting the input shaft 31 and the output shaft 32 under the action of the rotational torque applied to the input shaft 31. Accordingly, the rotational torque applied to the input shaft 31 can be calculated based on the difference in the detection signal.

Second Embodiment

Figure 9:
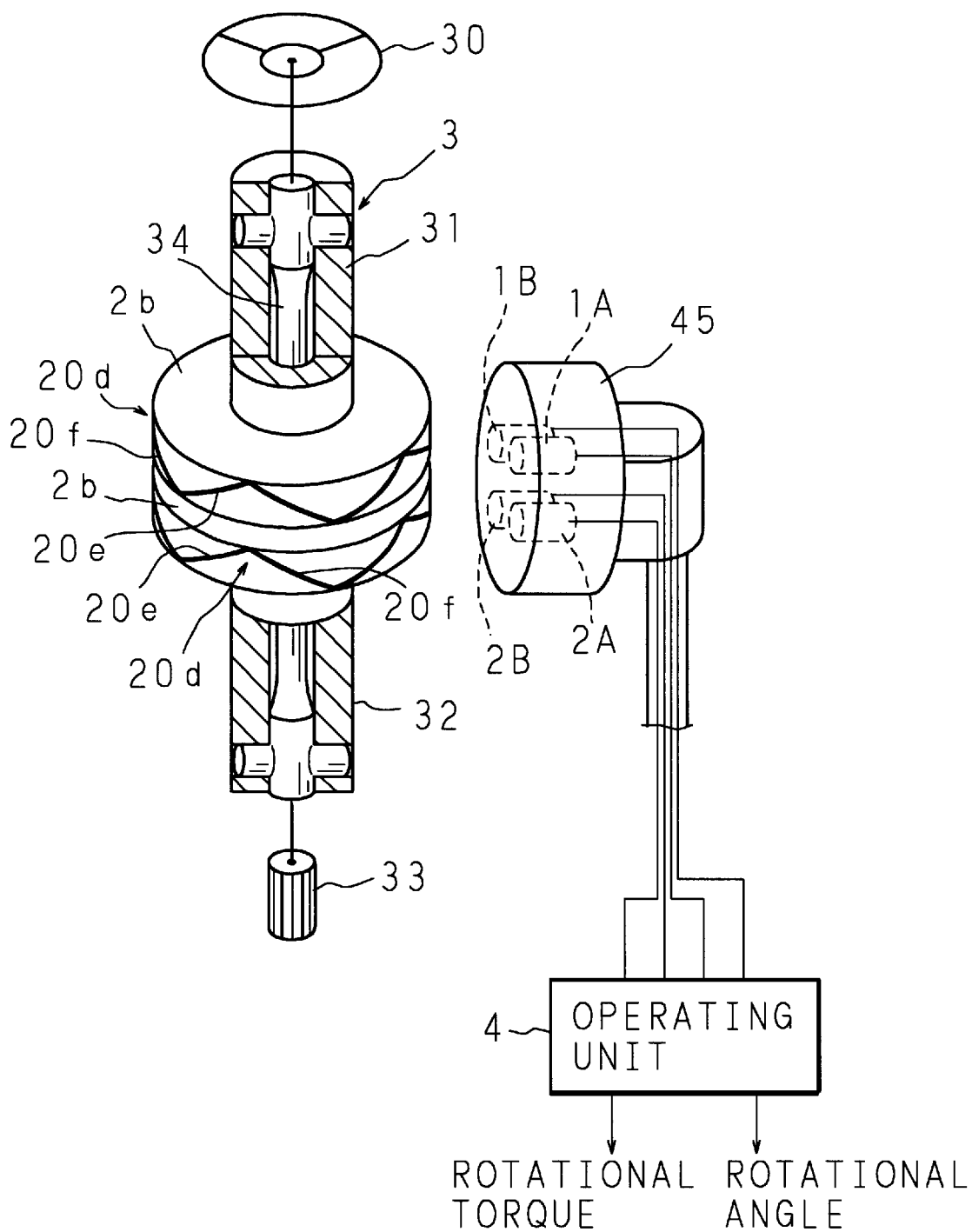
FIG. 9 is a schematic view showing the constructions of a rotational angle detecting device and a torque detecting device according to an embodiment of the present invention.

FIG. 9 is a schematic view showing the construction of a rotational angle detecting device and a torque detecting device according to a second embodiment of the present invention.

While the rotational angle detecting device and the torque detecting device in which the target 20a is a protrusion formed of a magnetic material has been described in the first embodiment, the target is not always the protrusion. In the rotational angle detecting device and the torque detecting device according to the second embodiment, a disk-shaped target plate 2b (rotating member) is externally fixed coaxially to the input shaft 31 in the vicinity of an end portion for connecting the output shaft 32, and a plurality of targets 20d (five targets in the drawing), which are not protrusions, are arranged on the outer circumferential surface of the target plate 2b.

The target 20d is a stripe having magnetism which includes a first inclining portion 20e provided with an inclination in one direction along the outer circumferential surface of the target plate 2b and a second inclining portion 20f provided with an inclination in the other direction. The targets 20d are arranged at same intervals in the circumferential direction of the outer circumferential surface of the target plate 2b.

The first inclining portion 20e and the second inclining portion 20f are almost line symmetrical with a straight line in the axial direction of the rotating shaft of the target plate 2b to pass through a connecting point thereof.

The target plate 2b including the same target 20d as that described above is also fixed externally to the output shaft 32 in the vicinity of the end portion for connecting the input shaft 31, and the target 20d of the target plate 2b on the output shaft 32 side and the target 20d of the target plate 2b on the input shaft 31 side are matched and arranged in the circumferential direction.

A sensor box 45 is provided on the outside of both target plates 2b to face the outer edges of the targets 20d on respective outer peripheries. The sensor box 45 is fixed and supported in a portion such as a housing which bears the input shaft 31 and the output shaft 32 and does not move.

The sensor box 45 contains magnetic sensors 1A and 1B opposed to different portions of the target 20d in the circumferential direction on the input shaft 31 side and the magnetic sensors 2A and 2B opposed to different portions of the target 20d in the circumferential direction on the output shaft 32 side. The magnetic sensors 1A and 2A, and that of 1B and 2B are accurately aligned with respect to the circumferential positions, respectively. Since other constructions and operations are the same as that of the rotational angle detecting device and the torque detecting device described in the first embodiment, description will be omitted.

Figure 10:
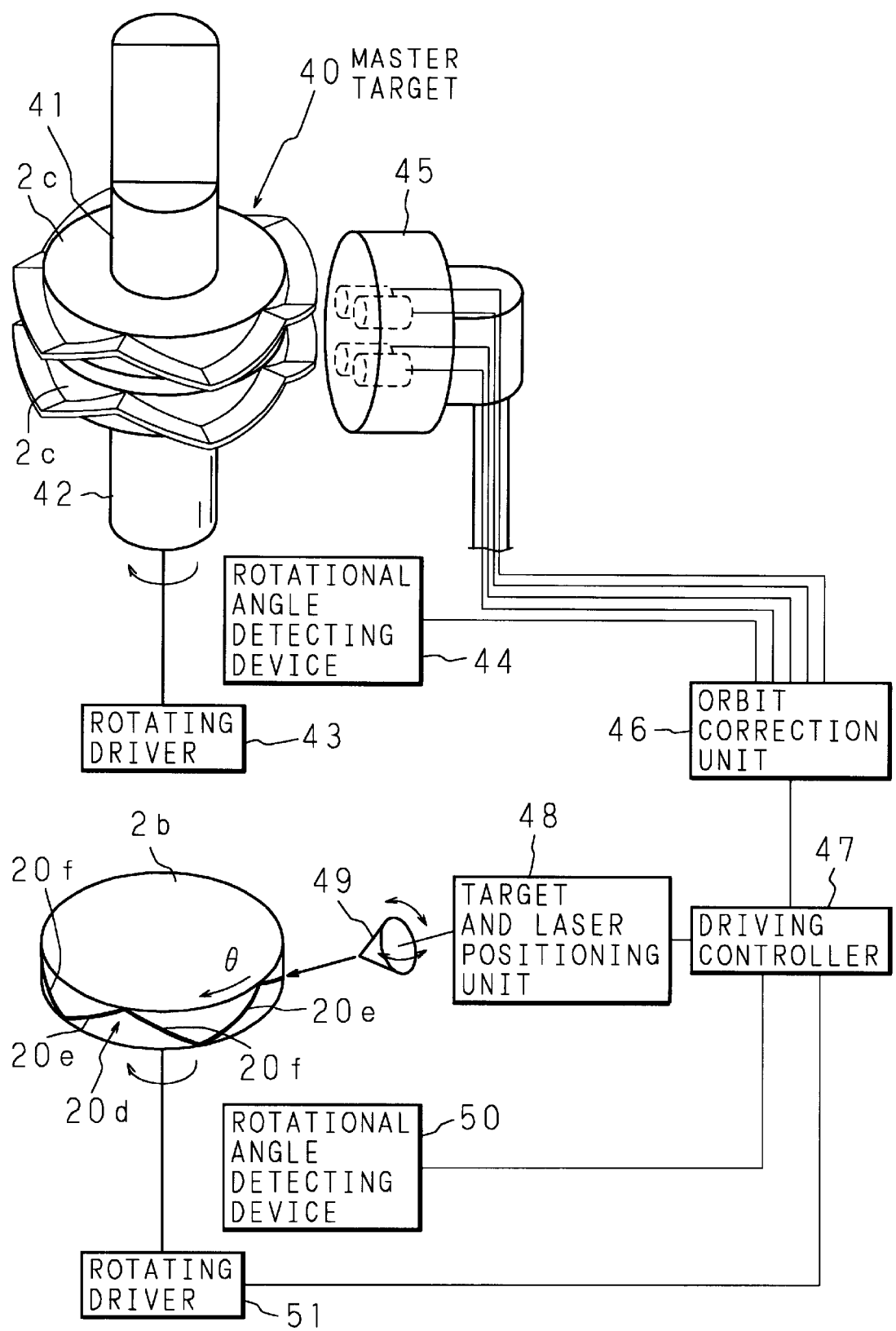
FIG. 10 is a diagram illustrating a method for forming targets.

FIG. 10 is a diagram illustrating a method of forming the target 20d.

In this forming method, a target plate 2b, a target plate 2c to be the standard of the target 20d and a master target 40 are externally fixed to a dummy input shaft 41 coaxially, and the target plate 2c and the master target 40 are externally fixed to a dummy output shaft 40 coaxially in the same manner. The mutual positional relationship is the same as that of the target plate 2b, the target 20d, the input shaft 31 and the output shaft 32.

The dummy input shaft 41 and the dummy output shaft 42 are rotated by a rotating driver 43, and rotational angles thereof are detected by a rotational angle detecting device 44 and is given to an orbit correction unit 46.

A sensor box 45 to be incorporated in a torque detecting device identical to the target 20d to be formed is provided and fixedly supported to face the outer edge of the master target 40.

As described above, the sensor box 45 contains magnetic sensors 1A and 1B to be opposed to the different portions of the target 20d in the circumferential direction on the input shaft 31 side and magnetic sensors 2A and 2B to be opposed to different portions of the target 20d in the circumferential direction on the output shaft 32 side. The magnetic sensors 1A and 2A, and that of 1B and 2B are accurately aligned with respect to the circumferential positions, respectively.

Each of the detection signals of the magnetic sensors 1A, 1B, 2A and 2B is given to the orbit correction unit 46.

The target plate 2b of the target 20d to be formed is rotated by a rotating device 51 and rotational angles thereof are detected by a rotational angle detecting device 50 and is given to a driving controller 47. The driving controller 47 controls the driving operation of a target and laser positioning unit 48 based on data given from the orbit correction unit 46 and the rotational angle detected by the rotational angle detecting device 50.

The target and laser positioning unit 48 controls the irradiating position and output power of a laser beam of a laser irradiating unit 49 and forms a stripe of the target 20d in the outer circumferential portion of the target plate 2b.

In a case where the target plate 2b is formed of metastable austenite based stainless steel to be a non-magnetic material, a ferromagnetic ferrite phase can be precipitated and magnetically discontinuous stripe portions can be formed by irradiating a heat source having a high energy density such as a laser beam or an electronic beam and carrying out rapid cooling as described above.

In the method of forming the target 20d which is to be executed with such a construction, the rotating driver 43 rotates the dummy input shaft 41 and the dummy output shaft 42, and the rotational angle detecting device 44 detects ration angles to be given to the orbit correction unit 46.

The magnetic sensors 1A, 1B, 2A and 2B in the sensor box 45 detect portions close to the master target 40 and gives the detection signals to the orbit correction unit 46, respectively.

At this time, if the target plate 2b of the target 20d to be formed is to be used for the input shaft 31, the orbit correction unit 46 reads either or both of the detection signals of the magnetic sensors 1A and 1B. When both of them are read, an average is obtained by correcting a difference in a phase (an average of the detection signal obtained by detecting the same portion of the target 20d).

Figure 11:
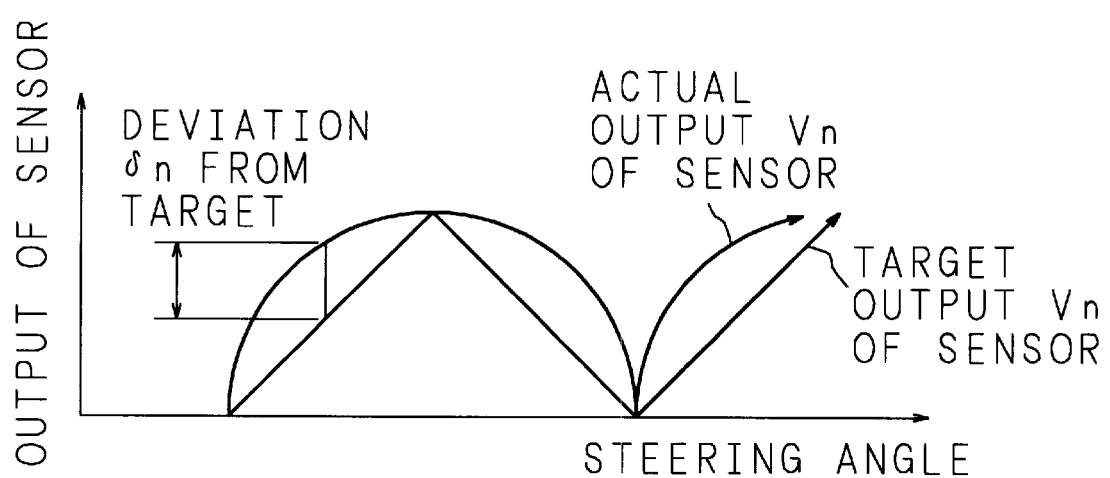
FIG. 11 is a diagram illustrating a method for forming targets.

As is particularly shown in FIG. 11, the orbit correction unit 46 calculates a deviation on between either of the detection signals (outputs) of the magnetic sensors 1A and 1B or the average Vn corresponding to the rotational angle detected by the rotational angle detecting device 44 and a target detection signal Vn' (output of sensor) corresponding to a prestored rotational angle (steering angle).

Figure 13:
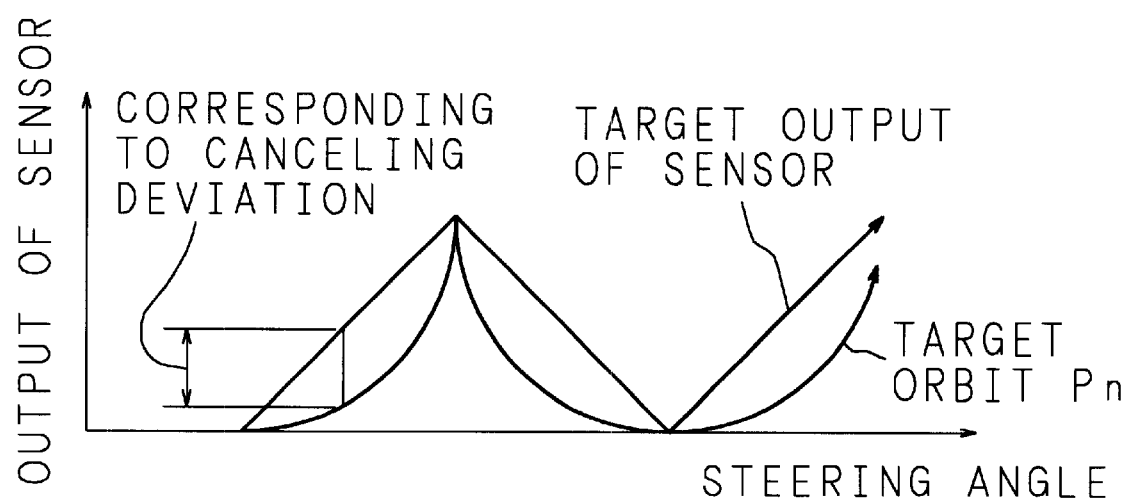
FIG. 13 is a diagram illustrating a method for forming targets.

As is particularly shown in FIG. 13, next, the orbit correction unit 46 calculates a position Pn of a deviation canceling orbit of a target which cancels the calculated deviation δn, thereby creating a list of an image shown in FIG. 12.

The orbit correction unit 46 gives data of the rotational angle (steering angle) and the position Pn of the deviation canceling orbit in the created list to the driving controller 47.

The driving controller 47 controls the driving operation of the rotating device 51 and the target and laser positioning unit 48 based on the given data and the rotational angle detected by the rotational angle detecting device 50.

The rotating device 51 drives to rotate the target plate 2b for maintaining the rotational angle indicated by the driving controller 47. The target and laser positioning unit 48 irradiates a laser beam over the outer circumferential portion of the target plate 2b while maintaining the position and output power of irradiation of the laser beam of the laser irradiating unit 49 indicated by the driving controller 47 to make a high temperature, then carrying out rapid cooling to precipitate a ferromagnetic ferrite phase, thereby forming a magnetically discontinuous stripe portion.

Also in the case in which the target plate 2b of the target 20d to be formed is to be used for the output shaft 32, the same processing as described above is executed by using the detection signals of the magnetic sensors 2A and 2B.

The stripe of the target 20d may be formed simultaneously with the detecting operation of the magnetic sensors 1A and 1B of the sensor box 45 or may be formed at another timing.

Third Embodiment

Figure 14:
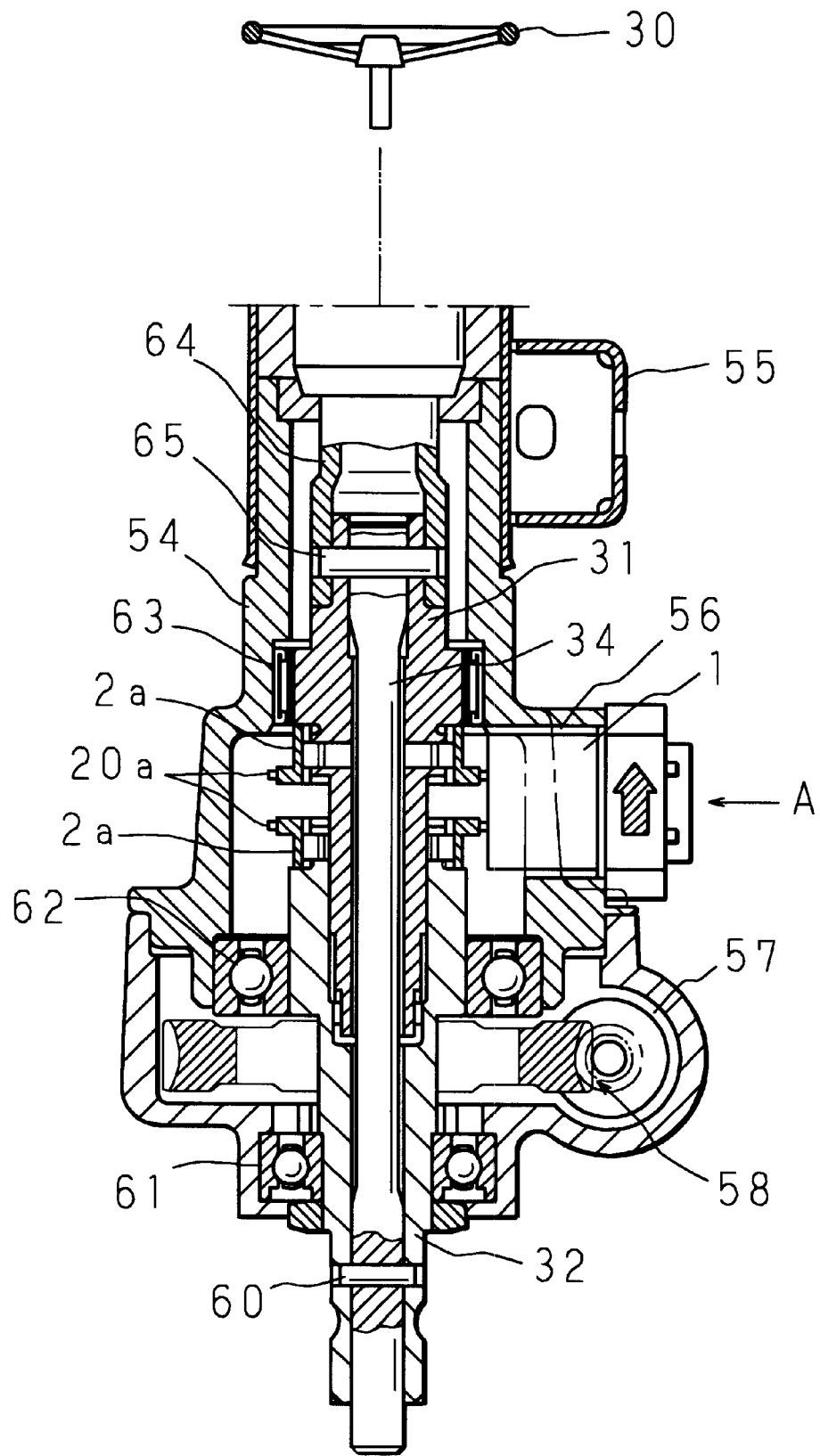
FIG. 14 is a longitudinal sectional view showing the construction of an essential portion of a steering apparatus according to an embodiment of the present invention.

FIG. 14 is a longitudinal sectional view showing the construction of an essential portion of a steering apparatus according to a third embodiment of the present invention.

The steering apparatus has an upper shaft 64 having a steering wheel 30 attached to an upper end thereof. A cylindrical shaft 31 and the upper end of a torsion bar 34 to be inserted therein are connected to the lower end of the upper shaft 64 through a first dowel pin 65. A cylindrical output shaft 32 is connected to the lower end of the torsion bar 34 through a second dowel pin 60. The upper shaft 64, the input shaft 31 and the output shaft 32 are rotatably supported in a housing 54 through bearings 63, 62 and 61, respectively.

The housing 54 is fixed, with a metallic mounting member 55, to a stable portion of a body.

The housing 54 includes a sensor box 1 of the torque detecting device described in the first embodiment which detects a steering torque based on the relative displacement of each of the input shaft 31 and the output shaft 32 which are connected through the torsion bar 34, and a reduction mechanism 58 for decelerating the rotation of a steering auxiliary electric motor 57 to be driven based on the detection result of the torque detecting device and for transmitting the decelerated rotation to the output shaft 32. The operation of a steering mechanism corresponding to the rotation of the steering wheel 30 is assisted by the rotation of the electric motor 57 and the burden of a driver for steering can be lightened. The lower end of the output shaft 32 is connected to a rack and pinion type steering mechanism through a universal joint.

As described in the first embodiment, the torque detecting device has such a construction that a target plate 2a (rotating member) to be disk-shaped is externally fixed coaxially to the input shaft 31 in the vicinity of the end portion for connecting the output shaft 32, and a plurality of targets 20a are arranged on the outer circumferential surface of the target plate 2a.

The target plate 2a providing the same target 20a is also fixed externally to the output shaft 32 in the vicinity of the end portion for connecting the input shaft 31, and the targets 20a of the target plate 2a on the output shaft 32 side and the targets 20a of the target plate 2a on the input shaft 31 side are matched and arranged in the circumferential direction.

A sensor box 1 is provided on the outside of both target plates 2a to face the outer edges of the targets 20a on respective outer circumferential surface. The sensor box 1 is fitted in and fixedly supported on a through hole 56 provided in the housing 54.

As described in the first embodiment, the sensor box 1 contains magnetic sensors 1A and 1B opposed to different portions of the target 20a in the circumferential direction on the input shaft 31 side and magnetic sensors 2A and 2B opposed to different portions of the target 20a in the circumferential direction on the output shaft 32 side. The magnetic sensors 1A and 2A, and that of 1B and 2B are accurately aligned with respect to the circumferential positions, respectively.

FIGS. 15A to 15D are views showing the appearance and section of the construction of the sensor box 1.

Figure 15C:
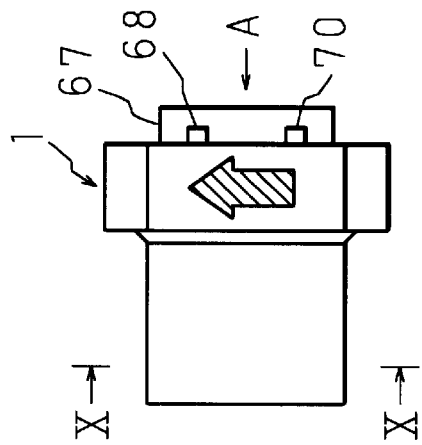
FIGS. 15A to 15D are views showing the appearance of the construction of a sensor box and a sectional view.
Figure 15B:
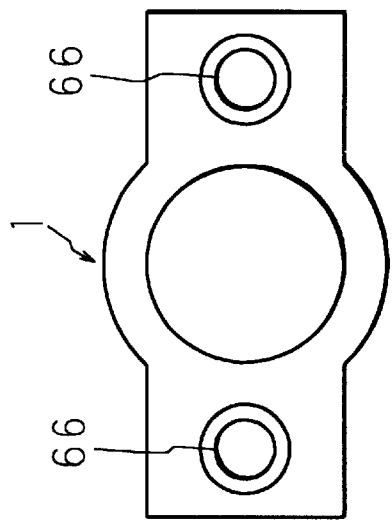
Figure 15D:
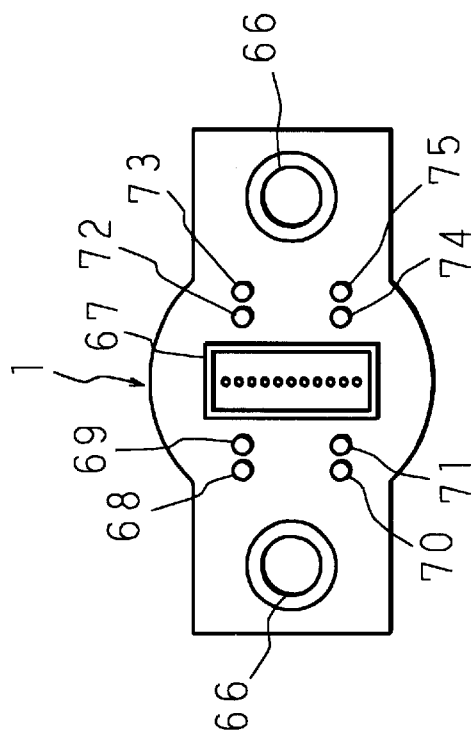

In FIG. 15D showing the appearance seen from a front in a direction of an arrow A in FIG. 14, the sensor box 1 has a construction that a connector 67 for outputting the detection signals of the magnetic sensors 1A, 1B, 2A and 2B to the outside is provided in a central portion thereof. The connector 67 includes one pin for a power supply, four pins for outputting the detection signals of the magnetic sensors 1A, 1B, 2A and 2B and one pin for a ground.

Both sides of the connector 67 are provided with a gain regulating volume 68 for the magnetic sensor 1A, an offset regulating volume 69 for the magnetic sensor 1A, a gain regulating volume 70 for the magnetic sensor 2A, an offset regulating volume 71 for the magnetic sensor 2A, a gain regulating volume 73 for the magnetic sensor 1B, an offset regulating volume 72 for the magnetic sensor 1B, a gain regulating volume 75 for the magnetic sensor 2B and an offset regulating volume 74 for the magnetic sensor 2B.

A bolt hole 66 for attaching the sensor box 1 to the housing 54 of the steering apparatus is provided on the outside of each volume group at both sides of the connector 67.

Figure 15A:
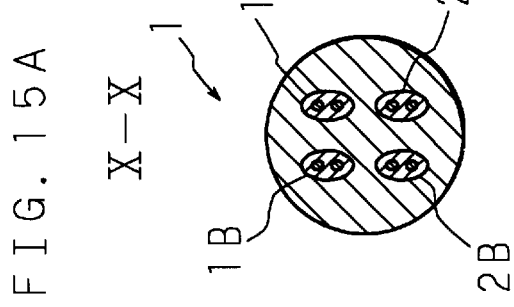

FIG. 15C shows the appearance seen from a side in a vertical direction with respect to the direction of the arrow A. On the opposite side to the side where the connector 67 is provided, a cylindrical portion is formed to be fitted in the through hole 56 of the housing 54. In FIG. 15A showing the section of the cylindrical portion taken along the line X—X, the cylindrical portion contains the magnetic sensors 1A, 1B, 2A and 2B with the construction described in the first embodiment. FIG. 15B is a view showing the appearance from the cylindrical portion side.

The operation of the steering apparatus having such a construction will be described below.

When the input shaft 31 and the output shaft 32 rotate without the torsion of the torsion bar 34, the input shaft 31, the output shaft 32 and the torsion bar 34 rotate integrally.

When a steering torque is applied to the steering wheel 30 and the input shaft 31 and the output shaft 32 rotate with the torsion of the torsion bar 34, a voltage difference corresponding to a torsional angle is generated on each of the detection signals V1A, V1B, V2A and V2B of the magnetic sensors 1A, 1B, 2A and 2B, for example, as shown in FIG. 8. The detection signals V1A, V1B, V2A and V2B are given through the connector 67 to a operating unit which is not shown, and the operating unit obtains a torsional angle by calculating the voltage difference. Thus, a signal corresponding to a steering torque can be outputted.

Moreover, the operating unit can calculate and output the rotational angle (steering angle) of the steering wheel 30 by using the detection signals V1A, V1B, V2A and V2B.

A signal corresponding to the steering torque and a signal indicative of the rotational angle of the steering wheel 30 are given to a control unit which is not shown, and the control unit controls the rotation of the electric motor 57 based on the given signals.

According to the rotational angle detecting device in accordance with the first aspect of the present invention, it is possible to realize a rotational angle detecting device capable of easily forming targets, stabilizing a peak value of a detection signal of the detecting means and readily calculating and correcting a rotational angle.

According to the rotational angle detecting device in accordance with the second aspect of the present invention, it is possible to realize a rotational angle detecting device capable of easily forming targets, reducing a non-linear region of a detection signal which is generated on the connecting portion of the inclining portions and the end of the target, stabilizing a peak value of a detection signal of the detecting means and readily calculating and correcting a rotational angle.

According to the rotational angle detecting device in accordance with the third aspect of the present invention, it is possible to realize a rotational angle detecting device capable of easily forming targets, reducing a non-linear region of a detection signal which is generated on the connecting portion of the inclining portions and the end of the target, stabilizing a peak value of a detection signal of the detecting means and readily calculating and correcting a rotational angle.

According to the rotational angle detecting device in accordance with the fourth aspect of the present invention, it is possible to realize a rotational angle detecting device capable of easily forming targets, increasing a detection sensitivity, stabilizing a peak value of a detection signal of the detecting means and readily calculating and correcting a rotational angle.

According to the rotational angle detecting device in accordance with the fifth aspect of the present invention, it is possible to realize a rotational angle detecting device capable of easily forming targets, stabilizing a peak value of a detection signal of the detecting means and readily calculating and correcting a rotational angle.

According to the rotational angle detecting device in accordance with the sixth aspect of the present invention, it is possible to realize a rotational angle detecting device capable of easily providing targets each having a small non-linear region of a detection signal which is generated in the connecting portion of the inclining portions and the end portions, stabilizing a peak value of a detection signal of the detecting means and readily calculating and correcting a rotational angle. Moreover, a detection error of the detecting means can be corrected in advance during manufacture.

According to the rotational angle detecting device in accordance with the seventh aspect of the present invention, it is possible to realize a rotational angle detecting device capable of easily forming targets, readily performing handling, reducing the cost of parts, stabilizing a peak value of a detection signal of the detecting means and readily calculating and correcting a rotational angle.

According to the torque detecting device in accordance with the eighth aspect of the present invention, it is possible to realize a torque detecting device using a rotational angle detecting device capable of easily forming targets, stabilizing a peak value of a detection signal of the detecting means and readily calculating and correcting a rotational angle.

According to the steering apparatus in accordance with the ninth aspect of the present invention, it is possible to realize a steering apparatus comprising a torque detecting device capable of accurately detecting a steering torque and easily forming targets of a rotational angle detecting device.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A rotational angle detecting device, comprising:
    a rotating member;
    a target which has a continuously variable inclining portion cyclically varying inclining directions, provided on said rotating member and the portion to be detected is continuously changed as said rotating member rotates; and
    at least one detecting means for detecting the portion close to said target; wherein
    a displacement angle of said rotating member from said detecting means in a rotational direction is detected based on the detected portion of said target detected by said detecting means.

2. The rotational angle detecting device as set forth in claim 1, wherein said target is formed by irradiating a beam to be a heat source along the circumferential surface of said rotating member.

3. The rotational angle detecting device as set forth in claim 2, wherein said target outputs each standard detection signal value when said detecting means performs detection, based on
    a deviation of each detection signal value outputted by detecting each portion of a master target as a standard by said detecting means and the standard detection signal value to be outputted by detecting each portion by said detecting.

4. The rotational angle detecting device as set forth in claim 1, wherein said target has a first inclining portion provided with an inclination in one direction along a circumferential surface of said rotating member and a second inclining portion provided with an inclination in the other direction along the circumferential surface of said rotating member.

5. The rotational angle detecting device as set forth in claim 4, wherein said target is formed by irradiating a beam to be a heat source along the circumferential surface of said rotating member.

6. The rotational angle detecting device as set forth in claim 5, wherein said target outputs each standard detection signal value when said detecting means performs detection, based on
    a deviation of each detection signal value outputted by detecting each portion of a master target as a standard by said detecting means and the standard detection signal value to be outputted by detecting each portion by said detecting.

7. The rotational angle detecting device as set forth in claim 4, wherein said first inclining portion and said second inclining portion have a relationship of almost line symmetry with respect to a straight line in an axial direction of said rotating member to pass through a connecting point of said both inclining portions.

8. The rotational angle detecting device as set forth in claim 7, wherein a plurality of targets are provided continuously along the circumferential surface of said rotating member.

9. The rotational angle detecting device as set forth in claim 7, wherein said target is formed by irradiating a beam to be a heat source along the circumferential surface of said rotating member.

10. The rotational angle detecting device as set forth in claim 9, wherein said target outputs each standard detection signal value when said detecting means performs detection, based on
    a deviation of each detection signal value outputted by detecting each portion of a master target as a standard by said detecting means and the standard detection signal value to be outputted by detecting each portion by said detecting.

11. A torque detecting device for detecting a torque applied to an input shaft based on a torsional angle generated on a torsion bar for coaxially connecting said input shaft and an output shaft, comprising:
    a rotational angle detecting device which is attached to each of said input shaft and said output shaft, comprising:
        a rotating member;
        a target which has a continuously variable inclining portion cyclically varying inclining directions, provided on said rotating member and the portion to be detected is continuously changed as said rotating member rotates; and
        at least one detecting means for detecting the portion close to said target; wherein a displacement angle of said rotating member from said detecting means in a rotational direction is detected based on the detected portion of said target detected by said detecting means; and means for detecting a difference between displacement angles detected by said rotational angle detecting devices; and wherein a difference between the displacement angles which is detected by said detecting means is detected as the torsional angle.

12. The torque detecting device as set forth in claim 11, wherein said target has a first inclining portion provided with an inclination in one direction along a circumferential surface of said rotating member and a second inclining portion provided with an inclination in the other direction along the circumferential surface of said rotating member.

13. The torque detecting device as set forth in claim 12, wherein said first inclining portion and said second inclining portion have a relationship of almost line symmetry with respect to a straight line in an axial direction of said rotating member to pass through a connecting point of said both inclining portions.

14. The torque detecting device as set forth in claim 13, wherein a plurality of targets are provided continuously along the circumferential surface of said rotating member.

15. A steering apparatus comprising:

an input shaft connected to a steering wheel;

an output shaft connected to a steering mechanism;

a torsion bar for connecting said input shaft and said output shaft; and a torque detecting device for detecting a torque applied to an input shaft based on a torsional angle generated on a torsion bar for coaxially connecting said input shaft and an output shaft, said torque detecting device comprising:

a rotational angle detecting device for detecting a steering torque applied to said input shaft based on a torsional angle generated by said torsion bar, said rotational angle detecting device being attached to each of said input shaft and said output shaft and comprising:

a rotating member;

a target which has a continuously variable inclining portion cyclically varying inclining directions, provided on said rotating member and the portion to be detected is continuously changed as said rotating member rotates; and at least one detecting means for detecting the portion close to said target; wherein a displacement angle of said rotating member from said detecting means in a rotational direction is detected based on the detected portion of said target detected by said detecting means; and means for detecting a difference between displacement angles detected by said rotational angle detecting devices; wherein a difference between the displacement angles which is detected by said detecting means is detected as a the torsional angle.

16. The steering apparatus as set forth in claim 15, wherein said target has a first inclining portion provided with an inclination in one direction along a circumferential surface of said rotating member and a second inclining portion provided with an inclination in the other direction along the circumferential surface of said rotating member.

17. The steering apparatus as set forth in claim 16, wherein said first inclining portion and said second inclining portion have a relationship of almost line symmetry with respect to a straight line in an axial direction of said rotating member to pass through a connecting point of said both inclining portions.

18. The steering apparatus as set forth in claim 17, wherein a plurality of targets are provided continuously along the circumferential surface of said rotating member.

* * * * *